J. P. DELANEY.
PRESSURE REGULATING VALVE.
APPLICATION FILED DEC. 6, 1911.
1,028,098.
Patented June 4, 1912.
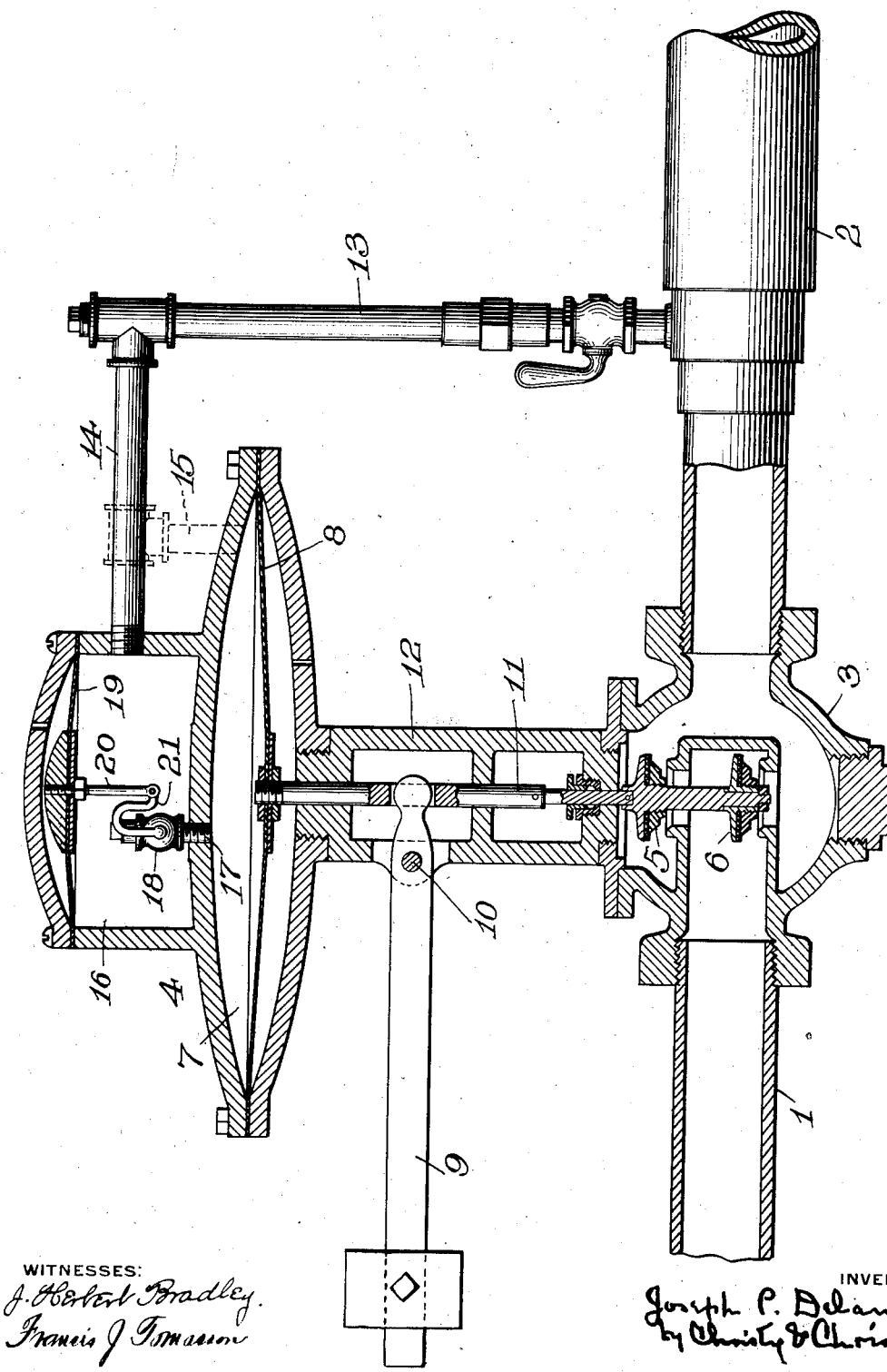
WITNESSES:
J. Herbert Bradley.
Francis J. Tomason
INVENTOR
Joseph P. Delaney
by Christy & Christy
Att'ys

UNITED STATES PATENT OFFICE.

JOSEPH P. DELANEY, OF PITTSBURGH, PENNSYLVANIA, ASSIGNOR TO MUNICIPAL SUPPLIES COMPANY, OF PITTSBURGH, PENNSYLVANIA.

PRESSURE-REGULATING VALVE.

1,028,098.  Specification of Letters Patent.  Patented June 4, 1912.

Application filed December 6, 1911. Serial No. 664,248.

*To all whom it may concern:*

Be it known that I, JOSEPH P. DELANEY, residing at Pittsburgh, in the county of Allegheny and State of Pennsylvania, a citizen of the United States, have invented or discovered certain new and useful Improvements in Pressure-Regulating Valves, of which improvements the following is a specification.

My invention has to do with regulators controlling the degree of opening of valves, which in turn control the flow of gas from high to low-pressure pipes; and my invention has particularly to do with valves wherein the degree of opening is maintained in an inverse ratio to the pressure in the low-pressure pipes.

The object of my invention is to provide a valve-regulator which will be effective to operate as described, but which will prevent the valve from flying wide open when the pressure in the low-pressure pipe falls below a predetermined amount.

My invention is illustrated in the accompanying drawing, which forms part of my specification, and which shows a longitudinal sectional view of a gas-valve regulator connected to high and low-pressure pipes.

In the construction shown herein, a high-pressure pipe 1 and a low-pressure pipe 2 are connected to opposite sides of a valve casing 3; and, to the top of the valve casing 3, a regulator 4 is secured. Any preferred form of valve may be used, that illustrated herein being a balanced double-seat valve, the plug 5 opening with, and the plug 6 against, the direction of flow of the gas. The regulator 4 preferably consists of a gas-tight gas-chamber 7, having a member (such as the diaphragm 8) movable therein by the pressure of gas, such movement being opposed by a suitable resistance, such as the weighted arm 9. The arm 9 may be pivoted, as at 10, and one end thereof may suitably engage the rod 11, which rod may be connected at its opposite ends to the diaphragm 8 and the plugs 5, 6, and may be mounted in the stem 12.

As usually constructed, the chamber 7 of such regulators has direct pipe connection to the low-pressure pipe 2, as by the pipes 13, 14 and dotted line pipe 15. In the operation of such a valve, gas flows from the pipe 1 through the double seated valve 5, 6 and into the low-pressure pipe 2, the said valve being held open by means of the weighted arm 9. Furthermore, gas from the low-pressure pipe flows through the pipes 13, 14 and 15 into the gas chamber 7, and presses against the diaphragm 8. The area of the diaphragm 8 exposed to the low-pressure gas, and the effectiveness of the weighted arm 9 are so correlated that the degree of opening of the said valve is inversely proportional to the pressure in the said chamber; and, when the said pressure rises to or above a certain predetermined amount, the valve will be entirely closed, remaining closed until the pressure falls below the said predetermined amount.

My invention consists specifically in adding to such a construction an auxiliary controlling mechanism, effective to prevent the valve 5, 6 from flying wide open when the pressure in the pipe 2 is materially decreased, as would happen in case a leak occurred therein. Preferably such mechanism consists of a second or auxiliary gas chamber 16 connected by the pipes 14, 13 to the low-pressure pipe, and having communication by means of the port 17 with the chamber 7. Also a suitable valve 18 is employed to control the flow of gas through the said port. Any desired pressure-controlled means, such as a well known weighted diaphragm 19 may be employed to control the operation of the said valve, the arrangement being such that the said valve will be normally held open by means of the pressure of the low-pressure pipe acting beneath the diaphragm to lift the weight, but, when such pressure falls below a certain predetermined amount, the weight will fall and the valve 18 (being connected by the rod 20 and arm 21 to the weight) will close. By the closing of the said valve, a quantity of gas will be confined in the chamber 7, and the said confined gas will be effective to prevent the diaphragm 8 from rising higher, with the consequent wider opening of the valve 5, 6. By such a construction, it will be seen that a safeguard is provided against a leak in the low pressure main, to the extent that the valve will not fly wide open and feed gas to the leak.

I claim herein as my invention:

1. In a gas-valve regulator, the combination with high and low-pressure pipes, a valve controlling communication between the said pipe, and a gas-tight chamber provided with a movable member having operative connection to said valve, of an auxiliary gas-chamber having communication with said gas-tight chamber and said low-pressure pipe, a valve controlling the communication between said gas-chambers, and means operated by gas from the said low-pressure pipe for maintaining said last named valve in open position, said means rendered ineffective when the low pressure gas falls to or below a predetermined amount.

2. In a gas-valve regulator, the combination with high and low pressure pipes, a valve controlling communication between said pipes, a gas-tight chamber, a movable diaphragm in said chamber, a rod connecting said valve and said diaphragm, and a weighted arm operatively connected to said rod, of an auxiliary gas-chamber having communication with said low-pressure pipe and said gas-tight chamber, a valve in said auxiliary chamber controlling the communication between the said gas-chambers, a weighted diaphragm in said auxiliary chamber and operative connection between said last named valve and said weighted diaphragm.

3. In a gas valve regulator, a valve chamber having a valve arranged to control the communication between the high and low pressure pipes, a gas-tight chamber independent of and closed off from the valve chamber and provided with a movable member having operative connection with the valve, and an auxiliary gas chamber communicating with said gas-tight chamber and also arranged to be connected to the low-pressure pipe, a valve controlling the communication between the gas chambers, and connections controlled by the gas from the low-pressure pipe for maintaining the last named valve in open position when the low-pressure gas exceeds a certain amount.

In testimony whereof I have hereunto set my hand.

JOSEPH P. DELANEY.

Witnesses:
PAUL N. CRITCHLOW,
FRANCIS J. TOMASSON.